W. H. McKENZIE.
VALVE TESTING MACHINE.
APPLICATION FILED MAR. 2, 1920.
1,373,824.
Patented Apr. 5, 1921.
4 SHEETS—SHEET 2.
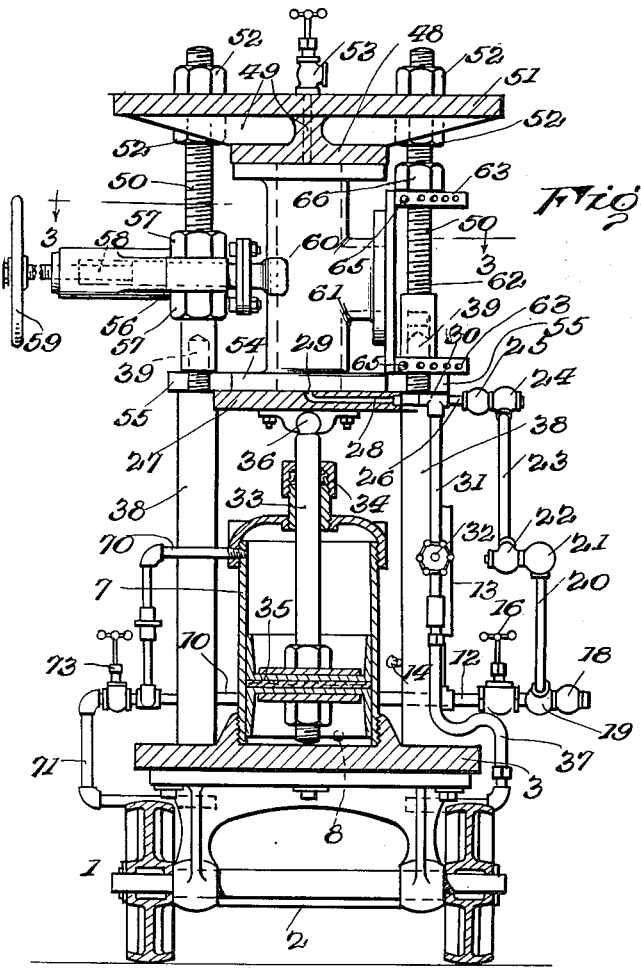
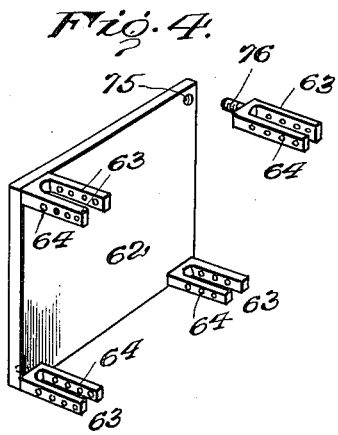
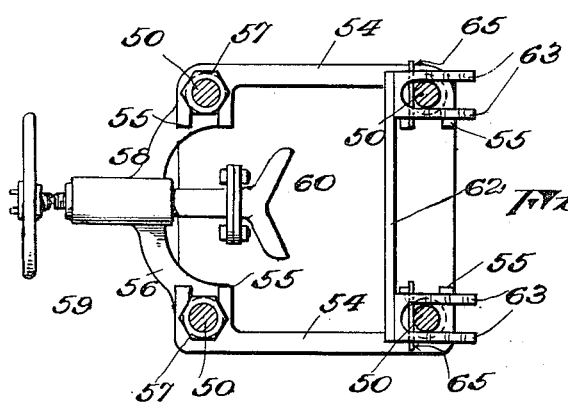
Inventor.
W. H. McKenzie.
by Lacey & Lacey, his Atty's W. H. McKENZIE.
VALVE TESTING MACHINE.
APPLICATION FILED MAR. 2, 1920.
1,373,824.
Patented Apr. 5, 1921.
4 SHEETS—SHEET 3.
Fig. 6.
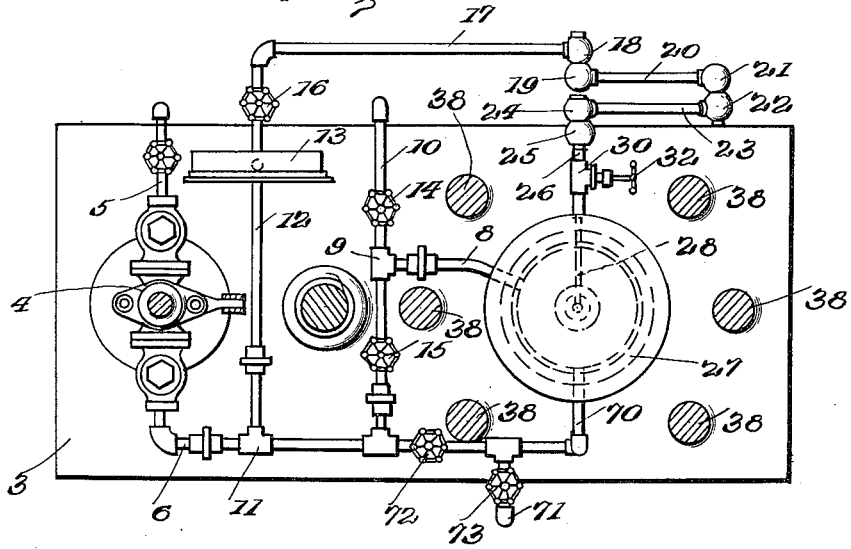
Fig. 10.
Fig. 7.
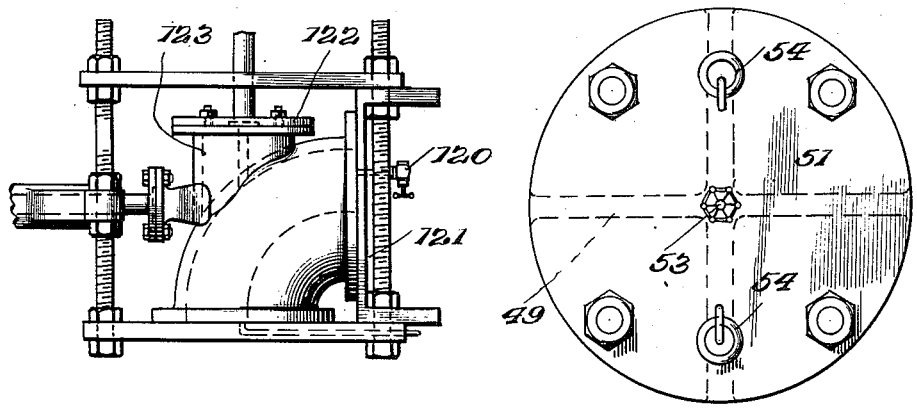
Inventor
W. H. McKenzie.
by Lacy & Lacy Att'ys.

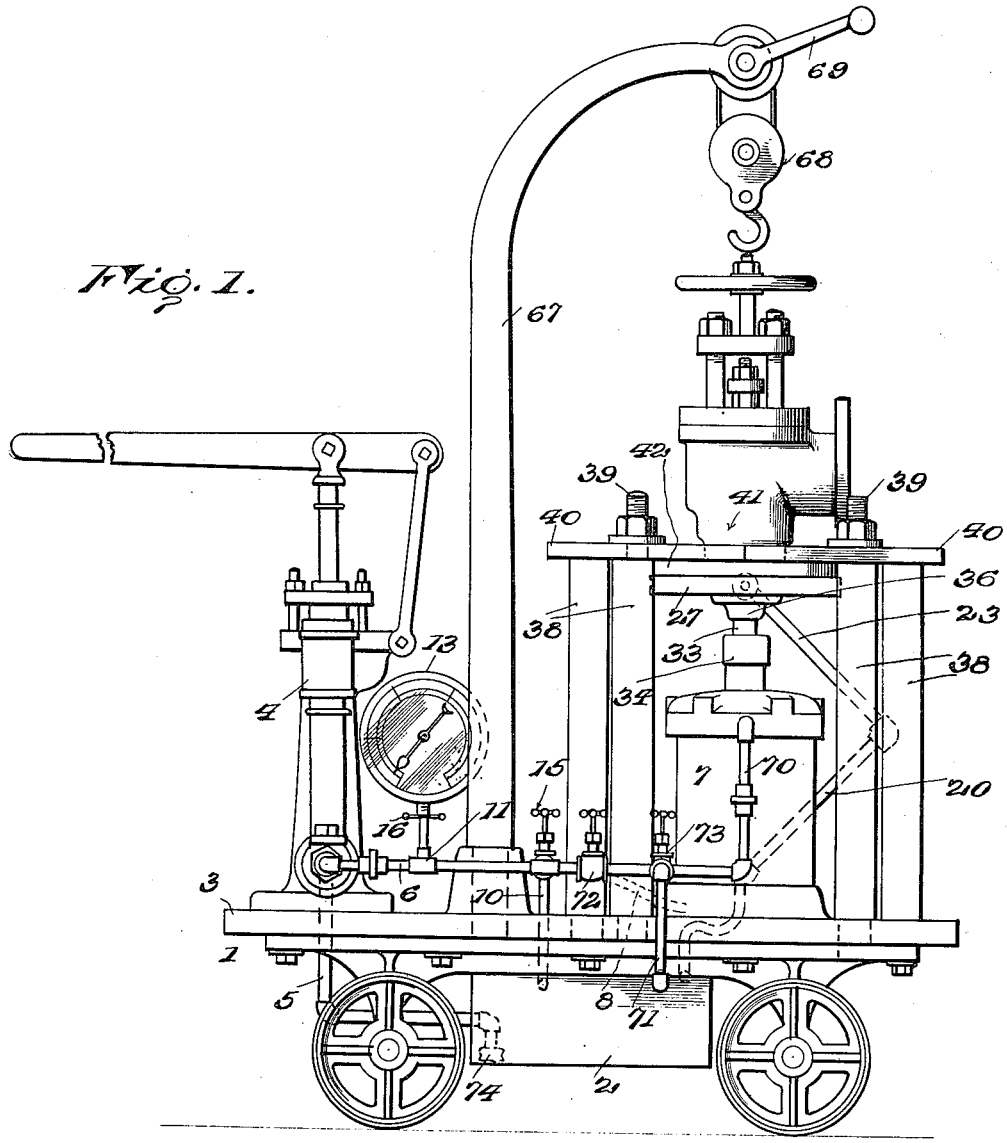

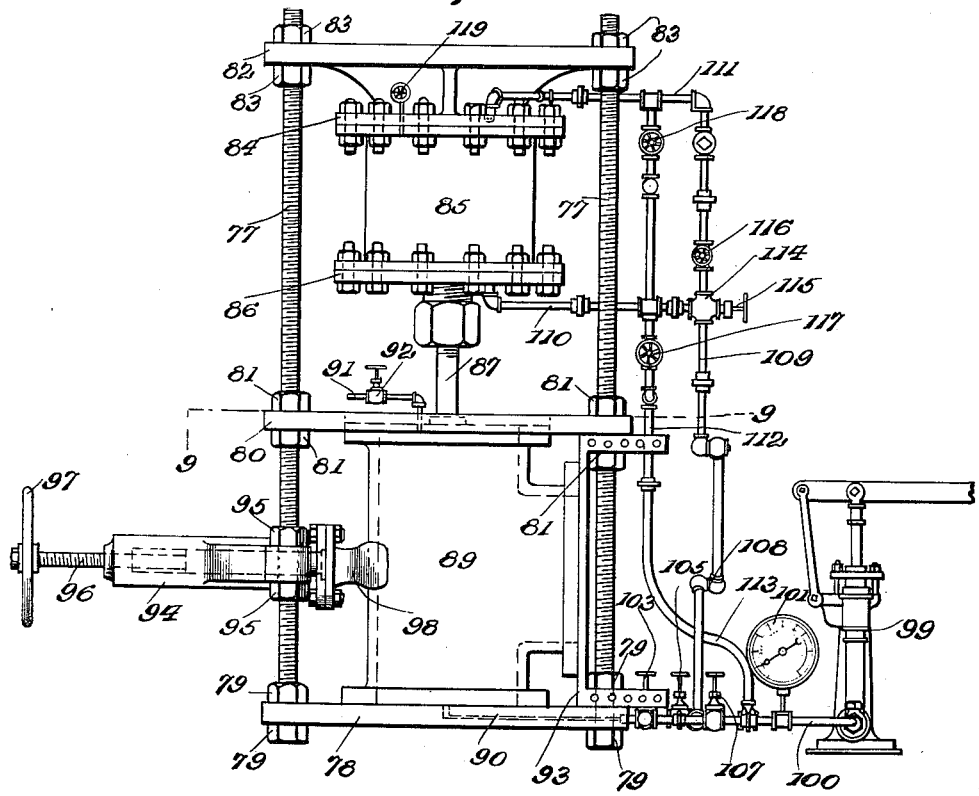
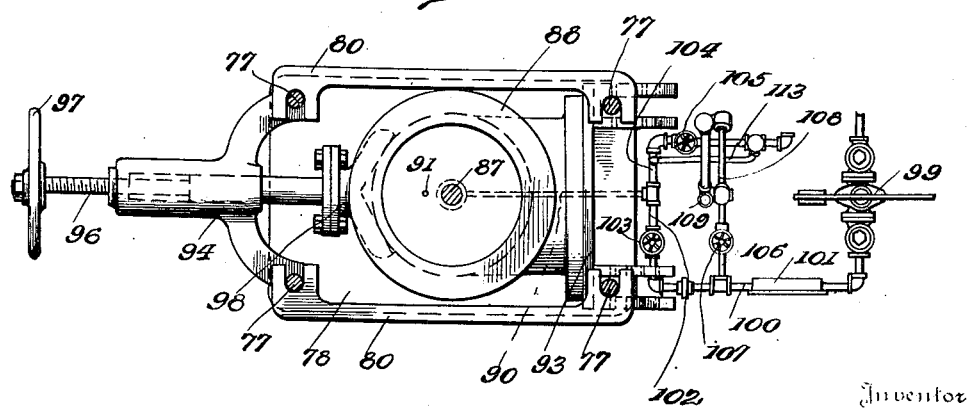

UNITED STATES PATENT OFFICE.

WILLIAM H. McKENZIE, OF OAKLAND, CALIFORNIA.

VALVE-TESTING MACHINE.

1,373,824.                    Specification of Letters Patent.     Patented Apr. 5, 1921.

Application filed March 2, 1920. Serial No. 362,849.

*To all whom it may concern:*

Be it known that I, WILLIAM H. McKENZIE, a citizen of the United States, residing at Oakland, in the county of Alameda and State of California, have invented certain new and useful Improvements in Valve-Testing Machines, of which the following is a specification.

The object of this invention is to simplify and improve the valve-testing machine for which Letters-Patent No. 1,298,236, were issued to me March 25, 1919, the present improvements seeking to extend the field of usefulness of the machine.

The invention is illustrated in the accompanying drawings, in which—

Figure 1 is a side elevation of the improved valve-testing machine;

Fig. 2 is a view partly in end elevation and partly in transverse section;

Fig. 3 is a detail horizontal section on line 3—3 of Fig. 2;

Fig. 4 is a detail perspective view of a backing plate employed in testing an elbow or T fitting;

Fig. 5 is a detail perspective view of a tie bar;

Fig. 6 is a view of the machine partly in plan and partly in horizontal section;

Fig. 7 is a plan view of the top clamping plate for securing a valve body in position for testing;

Fig. 8 is an elevation of another embodiment of the invention;

Fig. 9 is a horizontal section on the line 9—9 of Fig. 8;

Fig. 10 is an elevation showing another embodiment of the invention.

In carrying out my invention, I preferably mount the operating parts upon a truck 1 so that the apparatus may be readily transported from place to place but the mechanism may, of course, be stationary and in some instances a stationary apparatus may be preferred. In the illustrated embodiment of the invention, a reservoir 2 is secured below the platform 3 of the truck and may be of any dimensions according to the size of the particular machine in connection with which the same is to be used. The tank may be filled in any convenient manner and is shown as provided with a drain valve 74.

In the arrangement illustrated, a pump 4 is mounted upon the platform at one end thereof and the inlet end of said pump is connected by a pipe 5 with the reservoir or tank 2 so that upon operation of the pump, which may be of any well-known type, water will be drawn from the tank and driven through the outlet pipe 6 to the lifting piston and to the fitting to be tested. At the opposite end of the platform is mounted a cylinder 7 to which water is supplied through a pipe 8 leading into the lower end of the cylinder. This pipe 8 is connected by a T-coupling 9 to a transverse pipe 10 which at one end leads into the reservoir or tank 2 and at its other end is connected with the outlet pipe 6 from the pump, a T-coupling 11 connecting said outlet pipe with a branch pipe 12 which extends across the platform and carries a pressure gage 13. The pipe 10 is provided with a cut-off valve 14 between the pipe 8 and the tank and with a similar cut-off valve 15 between the said pipe 8 and the pipe 6. The pipe 12 extends laterally beyond the pressure gage 13 and the adjacent side of the platform and is equipped with a cut-off valve 16 beyond which it is carried longitudinally or parallel with the platform, as shown at 17, to a point approximately in the transverse plane of the cylinder 7 where it is equipped with one member 18 of a swivel or turning joint, the other member 19 of said joint being secured upon the end of a pipe 20 which, at its opposite end, carries one member 21 of a similar swivel joint. The coöperating member 22 of the last-mentioned swivel joint is carried by the lower end of a pipe 23 to which, at its upper end, is secured one member 24 of a third swivel joint, the coöperating member 25 of which is secured upon the outer end of a pipe 26 which leads to the head plate 27 upon which the fitting to be tested is supported. The said head plate is provided with a bore 28 which communicates directly with the pipe 26 and at its inner end is turned upwardly, as shown at 29, to open through the upper surface of the head plate at the center of the same. Intermediate the swivel joint member 25 and the head plate, a T-coupling 30 is interposed in the pipe 26 and connected with said T-coupling is a drain pipe 31 which extends downwardly past the platform and discharges into the tank 2, the said drain pipe being provided intermediate its height at any convenient point with a cut-off valve 32. The head plate is mounted upon the upper end of a piston rod 33 which extends slidably through a gland 34 on the head of the cylinder 7 and has its lower end secured in a piston or plunger 35 which is mounted within the cylinder 7, as clearly shown in Fig. 2. The head plate is connected with the upper end of the piston rod 33 by a ball and socket joint 36 so that the head plate may readily accommodate itself to the possible shifting angular relation of the piston rod and the pipes 20 and 23 in the operation of the apparatus and may also accommodate possible variations in the finish of the fitting to be tested so that under all circumstances a water-tight joint will be effected between the head plate and the fitting. It will be understood that the pipe 26 follows the vertical movement of the head plate and the swivel joints shown and described are provided to attain the requisite flexibility in the connection between the pipes 17 and 26, and, to accommodate the consequent movement of the pipe 31 relative to the tank, a hose 37 is utilized to establish communication between the said pipe and the tank.

Posts 38 are erected upon the platform in concentric spaced relation to the cylinder 7 and the outermost of these posts, or those posts nearest the side edges of the platform, are provided with reduced threaded extensions 39. Clamping plates 40 are supported upon the upper ends of these posts and are adapted to fit over the lower end flange of the fitting so that said flange will be clamped between the said plates and the head plate 27. In Fig. 1, a valve 41 is illustrated in position to be tested and the lower flange of this valve is indicated at 42. It will be noted that the flange rests directly upon the head plate and its upper surface bears directly against the under surfaces of the clamping plates which fit close to the body portion of the valve. The clamping plates are constructed to engage around the valve body from the opposite sides thereof with their edges meeting so as to exert a holding force around the entire circumference of the body.

When an elbow fitting is to be tested, the clamping plates 40 are not employed and extension rods 50 are fitted upon the threaded extensions 39 of the posts 38, a clamping plate 51 being secured upon the upper ends of these extension rods in any desired manner, as by nuts 52 secured upon the rods above and below the plates, as illustrated in Fig. 2. This clamping plate 51 is equipped at its center with a valve-controlled vent 53 so that, when the fitting is in position, the valve may be opened and an escape for the air trapped within the fitting thereby provided. At diametrically opposite points of the clamping plate, rings 54 or other convenient form of handles are provided so that the plate may be readily lifted from the extension rods or mounted thereon. The casing of the vent valve 53 is a part of the intersecting ribs 49 which are formed on the under side of the plate 51 to reinforce the same and prevent buckling thereof, the ribs being formed integral with a lower plate 48 against which the upper end of the fitting bears. Before the extension rods 50 are placed in position on the extensions 39, tie bars 54 are engaged with said extensions so as to prevent spreading of the posts. These bars are disposed transversely of the truck, as will be understood on reference to Figs. 2 and 3, and are provided at their ends with the forks or notched lugs 55 which are adapted to fit around the extensions or tenons 39 and rest on the shoulders presented by the upper ends of the posts. The extension rods 50 are externally threaded, as shown in Fig. 2, and a bracket 56 is mounted on the rods at one side of the apparatus and secured adjustably thereon by clamping nuts 57 fitted on the rods above and below the crosshead. Mounted centrally in the crosshead, is a follower screw 58 provided with an operating handle 59 at its outer end and carrying, at its inner end, a holding claw or seat 60 adapted to engage the fitting 61. At the opposite side of the machine, a backing or sealing plate 62 is provided to extend over and seal the side opening of the fitting, the fitting being forced against the plate by the holder 60 and the screw 58 as will be readily understood. The plate 62 rests on edge upon the tie bars 54 and spans the same at their ends remote from the holder 60, forked arms 63 being provided at the corners of the plate to engage the rods 50. Said arms have openings 64 therethrough to receive pins 65 at the inner sides of the posts and thereby adjust the plate to the size of the fitting to be tested. By inserting the pins through the proper openings 64, the plate may be held at a greater or less distance inwardly from the post so that, whatever the size of the fitting, it will be disposed centrally in its support, as will be readily understood. To withstand the pressure, the plate is boiler plate having threaded openings 75 at its corners and the arms or forks 63 are forgings having threaded stems 76 at their basal ends to engage said threaded openings. Nuts 66 may be mounted on the rods 50 above the arms 63 and turned home against the same to clamp the plate securely in place.

Communicating with the upper end of the cylinder 7 is a pipe 70 leading from the pipe 6 and having a branch 71 leading into the tank, cut-off valves 72 and 73 being provided in said pipe and branch respectively.

To facilitate the placing of the fitting upon the head plate and the removal of the same therefrom, I mount a crane 67 upon the platform between the pump 4 and the cylinder 7 and this crane carries a block and tackle mechanism, indicated at 68, at its upper end, said block and tackle being operated by a crank 69 or other convenient means.

It is thought the operation of the mechanism will be readily understood. When a valve is to be tested, the valve body is placed in position upon the head plate 27 with the inlet opening of the valve concentric with the end 29 of the bore 28 in the said head plate, the head plate being then in its lowest position. In this position of the parts, the valve 72 will be closed and the valve 73 open. The valves 14, 16 and 32 will also be closed and the valve 15 will be open. After the valve body 41 has been properly positioned upon the head plate, the pump 4 will be operated to draw water from the tank and this water will flow through the pipes 10 and 8 into the lower end of the cylinder 7 and act upon the piston 35 to lift the same, this lifting movement of the piston being transmitted through the rod 33 to the head plate and the valve body 41 so that the said valve body will be brought to the testing position. When the head plate has reached the upper limit of its movement the valve 15 is closed so as to maintain the pressure in the cylinder 7. The clamping plates 40 are then pushed inwardly so that their inner edges will meet around the valve body and over the flange 42 of the same and if the flange should not be firmly secured between the head plates and clamping plates, the valve 15 may again be opened and the pump operated so as to raise the piston and the head plate an additional distance sufficient to secure the valve body against movement after which, of course, the valve 15 will be again closed. The valve 16 will then be opened and the pump again operated so as to force water through the pipes 17, 20, 23 and 26 into the head plate and through the bore of the same into the interior of the valve body 41, it being understood, of course, that the outlet of the valve will be effectually sealed before the test begins. The gage 13 indicates the pressure to which the water flowing into the fitting is subjected by the action of the pump 4 so that if the fitting should develop a crack or other form of leak, it may be readily noted what pressure the fitting will sustain without serious leakage and if no leakage is discovered up to the capacity of the gage it may generally be rated as a perfect fitting. The machine built by me has a capacity of one thousand pounds pressure which is at least equal to the pressure to which any ordinary fitting is normally subjected. The fitting may be connected during the entire time it is in position upon the apparatus with the crane 67 and the clamping plates 40, of course, moved into position around the fitting before the head plate is raised so that it is not necessary to disconnect the fitting from the crane to conduct the test and then later again connect the fitting with the crane in order that it may be removed. The test being completed, the valve 16 is closed and the valve 32 opened so that the water within the fitting may drain back into the tank. After the water has been drained from the fitting, the valve 14 is opened to permit the water in the cylinder to drain back into the tank and the descent of the piston and the head plate will be facilitated by closing the valve 73 and opening the valve 72 whereupon water under pressure will be admitted to the top of the cylinder above the piston 35 and act on the piston to positively lower the same, it being understood that, during the upward movement of the piston, the water above the piston will return to the tank, the valve 73 being then open and the valve 72 closed as previously stated.

To test an elbow fitting or other form of coupling, the several valves are manipulated as just described but the machine is arranged as shown in Fig. 2, the plate 51 serving as a closure for the upper end of the fitting, and the pressure exerted upon the head plate and through the head plate upon the fitting should be sufficient to effect a water-tight engagement between the ends of the fitting and the head plate and clamping plate 51, respectively. By manipulation of the screw 58, the holder 60 will be caused to exert sufficient pressure upon the fitting to bind it firmly against the backing plate 62 and seal the side opening of the fitting against leakage. The bracket 56 may be easily adjusted to the height of the fitting which will be firmly held at its sides as well as at its ends. After the fitting has been secured in place, the vent valve 53 is opened so that as the water enters the fitting the trapped air may readily escape.

In Figs. 8 and 9, I illustrate an embodiment of the invention in which the hydraulic pressure for securing the fitting in position is applied at the top instead of the bottom of the same. The main supporting posts 77 are threaded from end to end and their lower ends are secured in the base plate 78 by nuts 79, the said base plate corresponding in construction in all respects to the head plate 27 of the previously described form of the invention. The bars 80 are secured upon the posts by nuts 81 at proper points above the base plate and at the upper ends of the posts a head block 82 is secured by nuts 83. The head block has a cylinder head 84 formed on its under side and to said head is bolted the upper end of a cylinder body 85 having a head 86 secured to its lower end. A piston (not shown) is fitted in the cylinder 85 and its stem or rod 87 extends slidably through the lower head 86 as will be readily understood. A force plate 88 is carried by the lower end of the rod 87 and is adapted to bear upon the upper end of the fitting 89 which, in Fig. 8, is a T. The base plate 78 is provided with a bore 90 through which the testing water is admitted to the fitting and the force plate is provided with a vent 91 controlled by a valve 92 for permitting escape of the air trapped in the fitting. The backing plate 93 is fitted to the posts 77 at one side of the machine between the base plate and the tie bars and may be secured in position by the same nuts 81 which secure the base plate and the tie bars. A bracket 94 is mounted upon the posts 77 at the opposite side of the machine and is secured in an adjusted position by nuts 95. An adjusting screw 96 is mounted in the bracket 94 and is provided at its outer end with a handle 97 while a holding claw 98 is secured to its inner end. These parts perform the same function as the bracket 56 and the members associated therewith but it will be noted that the two brackets are shown as of different shapes. Either form may be used as may be preferred.

The water for testing the fitting is drawn from any source of supply by a pump 99 and forced through a pipe 100 to the parts to be moved, a pressure gage 101 being provided on said pipe, as shown. A branch 102 connects the pipe 100 with the bore 90 and a valve 103 is fitted in said branch. A drain 104 leads from the bore 90 and is equipped with a valve 105. Another branch 106, having a valve 107, leads laterally from the pipe 100 and this branch is connected by the foldable conductor 108 with the upper feed pipe 109. This pipe 109 has a branch 110 leading to the lower end of the cylinder 85 and another branch 111 leading to the upper end of the cylinder. A drain pipe 112 is common to both branches 110 and 111 and communicates through a hose 113 with the drain 104 beyond the valve 105. The pipe 109 is connected with the branches 110 and 111 by a combined coupling and valve casing 114, the valve therein seating at one side thereof so as to control the flow to the branch 110 but offer no obstruction to the flow to the branch 111, and the stem 115 of the valve being long enough to project across and through the casing. A valve 116 in the branch 111 controls the flow therethrough and valves 117 and 118 are provided to control the drainage from the respective branches. A pressure gage 119 may be provided in the upper end of the cylinder 85 as shown.

The operation of this form of the invention will be readily understood. The backing plate 93 is properly adjusted and the fitting disposed as shown so that its branch will bear against said plate. The screw 96 is then manipulated to cause the claw or head 98 to bear upon the fitting with sufficient pressure to seal the side opening of the fitting against the backing plate. If the valve 117 be now opened and all the other valves closed, the weight of the force plate 88 and the piston connected therewith will cause the plate to descend and rest upon the upper end of the fitting. If the valve 116 be then opened, operation of the pump will force water into the upper end of the cylinder and the force plate will thereby be held upon the fitting with sufficient pressure to secure the same firmly in position and seal its ends, the valve 116 being then closed to hold the pressure. The vent 91 and the valve 103 are then opened whereupon operation of the pump will force water through the bore 90 into the fitting to make the test. The test being completed, the valve 103 is closed and the valve 105 opened to drain the fitting; the valve 118 is opened and the valve 117 closed, after which the valve in the casing 114 is opened. Operation of the pump will then drive water into the lower end of the cylinder to lift the piston and the force plate.

In Fig. 10, is shown a modification of the machine illustrated in Figs. 8 and 9 in which the vent 120 is carried by the backing plate 121 and the force plate 122 has a presser block or head 123 secured to and depending from its under side, the under side of said head or block presenting a concave socket to bear upon an elbow fitting, as shown.

My improved apparatus is very compact, is simply constructed and is strong and durable. In using the same, it is not necessary to manipulate a large number of bolts in order to secure the fitting to be tested in position and a large number of fittings or valves may be consequently thoroughly tested in a very short period of time. When a reservoir or tank is employed as a container for the water, the water used in a test drains back into the tank and may be repeatedly used.

Having thus described the invention, what is claimed as new is:

1. In an apparatus for the purpose set forth, the combination of a plurality of posts, a head plate movable vertically between the posts and adapted to support a fitting to be tested, means for raising the head plate, means for supplying liquid under pressure through the head plate to the fitting, a clamping plate secured on the posts above the fitting and against which the fitting is clamped by the head plate, said clamping plate being provided with intersecting reinforcing ribs on its under side, and a vent valve at the intersection of said ribs.

2. In an apparatus for the purpose set forth, the combination of a cylinder, spaced posts around the cylinder, a piston within the cylinder, a plate supported by the piston, a clamping plate mounted on the posts and against which a fitting may be clamped by the first-mentioned plate, a backing plate supported at one side of the fitting on the posts, and a holder mounted on the posts at the opposite side of the fitting and operable to secure the fitting against the backing plate.

3. In an apparatus for the purpose set forth, the combination of spaced posts, a head plate movable vertically between the posts to support a fitting, tie bars connecting some of the posts, a clamping plate mounted on the posts and against which the fitting is carried by the head plate, and means disposed at an angle to the tie bars to connect some of the posts and hold the fitting against lateral movement.

4. In an apparatus for the purpose set forth, the combination of spaced posts, a plate between said posts to support a fitting, a clamping plate secured on the posts, hydraulic means for securing a fitting between said plates, tie bars connecting some of the posts, a backing plate fitted to some of the posts between the tie bars, a bracket supported on some of the posts between the tie bars, and a holder mounted in said bracket to coöperate with the backing plate.

In testimony whereof I affix my signature.

WILLIAM H. McKENZIE. [L. S.]